United States Patent [19]

Favié

[11] 4,146,523

[45] Mar. 27, 1979

[54] METHOD OF PREPARING HOMOGENEOUS COMPOSITIONS IN THE FORM OF THERMOPLASTIC POLYMER PARTICLES SPECIALLY ADAPTED TO BE USED IN THE PREPARATION OF ADHESIVE SUBSTANCES FUSIBLE AT ELEVATED TEMPERATURES

[75] Inventor: Claude Favié, Pau, France

[73] Assignee: Societe National Elf Aquitaine (Production), Courbevoie, France

[21] Appl. No.: 806,863

[22] Filed: Jun. 15, 1977

[30] Foreign Application Priority Data

Jun. 22, 1976 [FR] France ............................ 76 18904

[51] Int. Cl.$^2$ ............................................. C08L 93/00
[52] U.S. Cl. ............................ 260/27 R; 260/27 EV; 260/27 BB; 260/29.2 N; 260/29.3; 260/29.6 NR; 260/29.6 RB; 260/841; 260/842; 260/843; 260/844; 260/847; 260/857 UN; 260/897 A
[58] Field of Search ......... 260/29.2 N, 29.3, 29.6 NR, 260/29.6 RB, 29.2 E, 27 R, 27 EV, 27 BB, 841, 842, 843, 844, 847, 857 UN, 897 A

[56] References Cited

U.S. PATENT DOCUMENTS

| | | | |
|---|---|---|---|
| 3,412,061 | 11/1968 | Drukker | 260/29.6 RB X |
| 3,560,420 | 2/1971 | Tamura et al. | 260/27 X |
| 3,600,347 | 8/1971 | Godar | 260/27 |
| 3,644,252 | 2/1972 | Shenfeld et al. | 260/27 EV X |
| 3,746,681 | 7/1973 | McClain | 260/29.2 E X |
| 3,900,694 | 8/1975 | Jurrens | 260/27 R X |
| 3,932,341 | 1/1976 | Kutch et al. | 260/27 R X |

*Primary Examiner*—Lewis T. Jacobs
*Attorney, Agent, or Firm*—Burgess, Ryan and Wayne

[57] ABSTRACT

A method of making homogeneous particulate compositions for use as heat-fusible adhesives which include a thermoplastic polymer and a gluing agent. The method includes the steps of preparing a mixture of water, the gluing agent, and a suspension agent, heating the mixture to the fusing temperature of the polymer, stirring in such a way that the molten mass is broken up into particles of about 0.005 to about 5 mm, cooling while stirring, and separating the particles from the aqueous phase.

15 Claims, No Drawings

METHOD OF PREPARING HOMOGENEOUS COMPOSITIONS IN THE FORM OF THERMOPLASTIC POLYMER PARTICLES SPECIALLY ADAPTED TO BE USED IN THE PREPARATION OF ADHESIVE SUBSTANCES FUSIBLE AT ELEVATED TEMPERATURES

BACKGROUND OF THE INVENTION

The present invention relates to a method of preparing homogeneous compositions in the form of thermoplastic polymer particles specially adapted for use in the preparation of adhesive substances fusible at high temperatures, which are generally designated by the term of "hot-melt" adhesives.

The compositions which are adapted to be used in the preparation of such adhesives, contain gluing agents mixed with the thermoplastic polymers; however this mixture is difficult to obtain, on account of the nature of the gluing agent; more particularly, considerable difficulty is encountered when attempting to prepare the said mixture in an extruder.

Another source of difficulty resides in the fact that the products to be mixed exhibit considerable differences in their physical form, or stems from the fact that the respective melting points of the various constituents are considerably different.

BRIEF SUMMARY OF THE INVENTION

The object of the present invention is to provide a simple process for the preparation of homogeneous compositions in the form of particles which may be easily treated in order to prepare hot-melt adhesives.

More particularly the object of the present invention is to prepare homogeneous compositions in the form of particles made from thermoplastic polymers containing at least one gluing agent and, possibly, various ingredients such as plasticizers, anti-oxidants and so forth, this preparation comprising the following steps:

preparation of a mixture containing the basic polymer or polymers to be incorporated in the composition, the gluing agent, water and at least one suspension agent, raising the temperature of the thus obtained aqueous mixture to a temperature between about 80° and about 250° C., preferably between 110° and 220° C., said temperature being such that the said polymer or polymers are in the form of a molten mass having a sufficiently low viscosity so that it disperses due to the effects of agitation, agitating said mixture while maintaining its temperature at a substantially constant level, so that the said molten mass is divided into particles whose size is between about 0.005 and about 5 mm.

cooling the suspension, the agitation being sufficient to maintain the thus formed particles in suspension, and separating the said particles from the aqueous phase.

The process of preparation according to the invention permits the obtention of compositions in the form of particles which manifest no tendency to agglomerate and which can easily be stocked for use at a later time.

DESCRIPTION OF THE PREFERRED EMBODIMENTS

The thermoplastic polymers constituting the base of said compositions are selected from the group comprising the polyolefins such as polyethylene, polypropylene, ethylene-propylene copolymers; statistic, sequential or graft copolymers of olefins and vinyl monomers such as ethylene-vinyl acetate copolymers; polyvinyls such as polyvinyl chloride and polyvinyl acetate; polyarylvinyls, especially polystyrene; poly(methylstyrene); polyesters; polyacrylates such as polymethyl-methacrylate; polyamides such as e.g. polyundecanamide, polydodecalactam, polycaprolactam, known, respectively, under the commercial designations of "RILSAN", "Nylon 12" and "NYLON 6".

Broadly speaking any thermoplastic polymer may be used, provided it has sufficient fluidity, either per se or resulting from the plastifying effect which is due to the addition of one or more other polymers or additives, in order that the molten mass of thermoplastic polymer can be divided into particles, which have the above mentioned size, under the effect of appropriate stirring.

The gluing agents, used advantageously when carrying out the method according to the present invention, are selected more specifically from the group comprising terpenic resins, coumarone-indene resins, modified phenolic resins, isobutene-styrene copolymers and similar substances.

Amongst the above mentioned substances certain terpenic derivatives, which are in the liquid state at a temperature of about 110° C., will cause a considerable plastification of the initial polymer mixture and thus promote the desired division into particles.

Plasticizers, such as paraffin waxes or crude oil resins also contribute to the desired viscosity of the starting mixture and facilitate the division into particles. A large variety of plasticizers can be used.

The suspension agent, used for carrying out the method of the present invention, may be selected, although one need not be limited to this selection, from the group comprising ionic agents, such as phosphates, especially tribasic sodium phosphate; they also may be constituted by mixtures of tribasic sodium phosphate and calcium chloride ($CaCl_2$). Their concentration is between about 0.1 and about 5% of the organic phase.

These suspension agents contribute to the division of the molten polymer mass and maintain the division resulting from the stirring or agitation.

This plastic mass can be prepared according to a certain number of different methods which are indicated herein-below:

the mixture is first prepared in a melting device and then poured into the aqueous phase;

the mixture is first prepared in the reactor, after which the aqueous phase is poured into the said reactor;

the mixture is first prepared in the aqueous phase, and then the setting of the plastic mass is initiated at a predetermined temperature.

The preparation processes are indicated by way of illustration, and in no way do they constitute a limitation.

In a modified embodiment the compositions according to the invention, are prepared by adding to the starting polymers at least one monomer whose polymerization is initiated by the action of a catalyst. The aim of this polymerization is to increase the ingredients' affinities in the composition, due to a grafting reaction. The term of "increasing the ingredients' affinities in the composition" implies a combination of two polymers as well as a combination of one or more polymers and nonpolymeric components such as for e.g. gluing agents.

The monomer may be added to the starting mixture of polymers and which is stirred thus promoting the division into particles, before the addition of the catalyst; this catalyst is selected in order to fix the monomer onto one or more of the constituents present in the reaction mixture.

In a modified embodiment according to the process of the invention, the monomer is added to the mixture of polymers during the heating period.

In another embodiment according to the invention, the monomer is added to the polymer mixture when the cooling of the molten mass, which is divided into particles in suspension in water, is initiated.

The catalyst can preferably be added during the cooling period of the reaction mixture.

Various monomers, can be used to carry out the method according to the invention; generally they must possess hydrophobic properties so that the polymerization does not occur in water, but takes place in the viscous polymer phase. Said monomers may be acrylic monomers, in particular alkyl acrylates or alkyl methacrylates, vinylic monomers such as vinyl chloride or vinyl acetate, aromatic monomers such as styrene and styrene derivatives; it being understood that a single monomer or a mixture of monomers can be used.

The choice of the monomer is governed by the required affinity increase of the various components which are present, and also by the desired properties of the resulting polymers. For example, when styrene is added, it is possible, while improving the compatibility, to obtain a required hardness of the composition and, more specifically, a required hardness of the hot-melt adhesive. For a given resin composition and monomer concentration, the properties of the final product depend on the nature of the monomer or monomers used. Thus methyl methacrylate gives rise to increased hardness in the composition, whereas ethylhexyl methacrylate leads to an increased adhesiveness.

The monomer concentration may be between about 5 and about 89% by weight of the final amount of the constituents present, and preferably said concentration will be between about 5 and about 50% of the weight of said constituents.

The catalyst used for initiating the polymerization of the monomer is selected from the group of the well-known free radical initiators, and more particularly from the group of chemical generators of free radicals such as benzoyl or lauryl peroxides, tertiary butyl or cumene hydroperoxides, peresters such as tertiary butyl perbenzoate; each of these examples being given by way of illustration, but not of limitation.

When carrying out the method according to the invention, the stirring or agitation causing the treated mixture to divide into particles having a size comprised between about 0.005 and about 5 mm is preferably performed at a rate corresponding to speeds comprised between about 50 rpm and about 1500 rpm, preferably comprised between about 250 and about 1000 rpm when a stirring device of the flat anchor type is used wherein the anchor has a width of 70 mm, a height of 70 mm and a thickness of 7 mm, said anchor being immersed in 1 liter aqueous mixture contained in a cylindrical reactor having a diameter of 76 mm. The configuration of the stirring device is not part of the present invention, but is should be noted that it may contribute efficiently to the achievement of the object of the invention.

The invention will now be described in a more detailed manner by means of the following examples.

EXAMPLE 1

A reactor having a capacity of two liters and a diameter of 76 mm provided with a flat anchor stirring device was used. The stirring anchor had a width of 70 mm, a height of 70 mm and a thickness of 7 mm.

- 1000 parts of water containing suspension agents of the phosphate type,
- 55 parts low density polyethylene having a melt index of 15,
- 10 parts of high density polyethylene having a melt index of 20,
- 8 parts ethylene/methyl acrylate copolymer having an acrylate content of 10% by weight,
- 15 parts ethylene/vinyl acetate copolymer having a vinyl acetate content of 30%,
- 7 parts esterified colophony gluing agent, and
- 5 parts crude oil resin plasticizer were introduced into this reactor. The temperature was raised to 200° C. At this temperature, the compact mass was stirred by rotation of the stirring anchor at a speed of 1000 rpm. This rotational speed was maintained for 10 minutes, whereby the above-mentioned mass was divided or broken up into particles. The thus divided mass was then allowed to cool while being stirred at 200 rpm. The particles previously obtained were then separated from the aqueous phase by filtration. The average size of the resulting particles was comprised between 0.5 and 2 mm.

EXAMPLE 2

In this example, the starting mixture had a composition similar to that described in Example 1, however a small amount of peroxide was added during the cooling step, at about 130° C., with a view to initiating certain cross-linked reticulation.

A mixture containing the following substances was poured into

- 1000 parts water containing suspension agents in a reactor similar to the one used in Example 1,
- 60 parts low-density polyethylene having a melt index of 40,
- 10 parts ethylene/ethyl acrylate copolymer having an acrylate content of 10%;
- 10 parts ethylene/vinyl acetate copolymer having an acetate content of 20%,
- 12 parts esterified colophony, and
- 8 parts crude oil resins.

This mixture was changed into a suspension as described in Example 1. During the cooling step 0.2 parts of tertbutyl perbenzoate was added at a temperature of 140° C., and the suspension was maintained at this latter temperature during 4 hours. The suspension was then allowed to cool further while being agitated at 200 rpm and the granular mass thus obtained was separated from the aqueous phase by filtration. The resulting particles had an average size of between 0.4 and 1.5 mm.

EXAMPLE 3

In this example a monomer was added to the starting polymer mixture. 1000 parts water and suspension agents of the calcium phosphate type were introduced into a reactor having a capacity of 2 liters, of a construction similar to that of the reactor used in accordance with Example 1.

A mixture previously prepared in a melting installation and containing:

45 parts low-density polyethylene having a melt index of 15,
20 parts ethylene/vinyl acetate copolymer having an acetate content of 40%,
3 parts polyethylene wax plasticizers, and
12 parts colophony esterified with pentaerythritol as a gluing agent
was then introduced into the reactor, in the form of cuttings.

Finally, a monomer being constituted by 20 parts of hexyl acrylate was added. After scavenging with argon, the reactor was then closed. The reaction medium was rapidly heated to 195° C. When this temperature had been reached stirring was initiated at 900 rpm and maintained for 10 minutes. The temperature was then reduced to 130° C. and 0.18 part tertbutyl perbenzoate was injected as a monomer grafting agent and polymerization catalyst.

The reaction was continued for 4 hours, while an agitation at a speed of 200 rpm was maintained. The reactor was then cooled and the dispersion obtained was filtered so as to separate it from the water. A powder having a particle size comprised between 0.1 and 1 mm was thus obtained. This powder was thermoplastic and particularly adapted to be used in the field of adhesives, especially hot-melt adhesives.

The operating conditions may be modified, especially in accordance with the nature of the constituents used.

The temperature at which the polymers are introduced should be between about 20° and about 200° C., preferably between about 20° and about 150° C.

Furthermore, when it is desired to add the monomer prior to the division of the molten mass into particles, said monomer may be introduced at a time when the temperature is comprised between 20° and 200° C.; however when it is desired to add said monomer during the step of cooling the suspension, it may be introduced at a temperature comprised between about 200° and about 50° C., preferably between about 150° and about 70° C.

The catalyst is added at a temperature comprised between about 50° and about 180° C. preferably between about 80° and about 140° C.

EXAMPLE 4

A monomer was added after the mixture had been divided into particles. This mixture was composed of:
62,5 parts low-density polyethylene having a melt index of 40,
12,5 parts polyethylene wax plasticizer, and
10,5 parts esterified colophony gluing agent.

The mixture was heated to 200° C. without stirring. When this temperature was reached, stirring was performed at 900 rpm for 15 minutes. The temperature was then lowered and at 175° C. the monomer was injected. The monomer was composed of 14.4 parts butyl acrylate. The temperature was further lowered to 130° C. and a catalyst constituted by 0.13 part tertbutyl perbenzoate was added. Polymerization was continued for 4 hours, and granulates having a particle size between 0.05 and 2 mm were obtained.

EXAMPLE 5

1000 parts of water which contained suspension agents were introduced into a reactor similar to the one used in Example 1, and a molten mixture containing:
55 parts low-density polyethylene having a melt index of 15,
20 parts polyundecanamide known under the commercial designation "NYLON 11", and
8 parts esterified colophony were then added.
22 parts of butyl acrylate were subsequently added.

The entire mixture was rapidly heated to a temperature of 215° C. While maintaining this temperature, the contents of the reactor were submitted to stirring at a rotational speed of the stirring anchor of 1200 rpm, said stirring being continued for 10 minutes.

The thus formed suspension was then cooled to 140° C. while being stirred a speed of 220 rpm. 0.2 part of tertbutyl perbenzoate was then added as a monomer grafting and polymerization agent. The reaction medium thus prepared was maintained at a temperature of 140° C. while being stirred at 220 rpm for 3.5 hours.

At the end of this period of time the suspension was cooled to ambient temperature, at which time the particles were separated from the water by filtration. After drying, a powder having particles of a size between 0.05 and 1 mm was obtained.

It should be understood that the invention is not limited to the examples given herein above, and that numerous modifications and variants may be envisaged within the scope of the invention.

What is claimed is:

1. Method of preparing of homogeneous composition in the form of particles for use in the preparation of adhesive substances fusible at elevated temperatures, said composition comprising thermoplastic polymers and at least one gluing agent selected from the group consisting of terpenic resins, coumarene-indene resins, modified phenolic resins, isobutene-styrene copolymers, colophony, and mixtures thereof, and which comprises
   (a) preparing a mixture containing water, said polymers, said gluing agent and at least one suspension agent;
   (b) raising the temperature of the aqueous mixture to between about 80° and 250° C., said temperature being selected so that said thermoplastic polymers are present in the form of a molten mass having a viscosity sufficiently low to allow said mass to be divided into particles under the effect of stirring;
   (c) stirring said aqueous mixture while maintaining the temperature at the selected value, said step of stirring being performed in such a manner that said molten mass is divided into homogeneous particles having a size between about 0.005 and about 5 mm;
   (d) cooling the resulting suspension of particles at a rotational stirring speed sufficiently high to maintain said particles in suspension, and
   (e) separating said particles from the aqueous phase.

2. A method of preparing a homogenous composition in the form of particles for use in the preparation of adhesive substances fusible at elevated temperatures, said composition comprising thermoplastic polymers and at least one gluing agent selected from the group consisting of terpenic resins, coumarene-indene resins, modified phenolic resins, isobutene-styrene copolymers, colophony, and mixtures thereof, and which comprises
   (a) preparing a mixture containing water, said polymers, said gluing agent at least one suspension agent and at least one polymerizable monomer for increasing the affinity of the constituents of said mixture;
   (b) raising the temperature of the aqueous mixture to between about 80° and 250° C., said temperature being selected so that said thermoplastic polymers are present in the form of a molten mass having a viscosity sufficiently low to allow said mass to be divided into particles under the effect of stirring;

(c) stirring said aqueous mixture while maintaining the temperature at the selected value, said step of stirring being performed in such a manner that said molten mass is divided into homogeneous particles having a size between about 0.005 and about 5 mm;

(d) cooling the resulting suspension of particles at a rotational stirring speed sufficiently high to maintain said particles in suspension and (e) separating said particles from the aqueous phase, said method involving the addition of at least one polymerizable monomer in one of the above-cited steps.

3. The method of claim 2 wherein said monomer is added to said mixture while the temperaure of the latter is brought to the value at which the division step is to be performed.

4. The method of claim 2, wherein a polymerizable monomer is injected into the mass divided into particles at the beginning step involving cooling at a reduced rate of stirring.

5. The method of claim 2 wherein after adding said monomer, a catalyst is added during said step of cooling, at a temperature between 80° and 140° C.

6. The method of claim 1, wherein the various constituents of the composition to be prepared are previously mixed in a melting installation, the thus prepared mixture being then be poured into the aqueous phase.

7. The method of claim 1, wherein the various constituents of the composition to be prepared are mixed previously in the reactor, whereafter the aqueous phase is added.

8. The method of claim 1, wherein said thermoplastic polymers are selected from the group consisting of polyolefins, random sequential or graft copolymers of olefins and vinylic monomers, polyvinylchloride, polyvinylacetate, polyarylvinyl compounds, polyesters, polyacrylates and polyamides.

9. The method of claim 2, wherein the concentration of said monomer is between about 5 and about 90% by weight of the final amount of the constituents.

10. The method of claim 1 wherein the mixture further contains a plasticizer.

11. The method of claim 1 wherein the suspension agent contains a phosphate and is present in an amount of from about 0.1 to about 5% by weight based on the organic phase.

12. The method of claim 2, wherein after adding said monomer, a catalyst is added during said step of cooling, at a temperature of between 50° and 180° C.

13. The method of claim 2, wherein said concentration of said monomer is between 5 and 50% by weight.

14. The method of claim 8, wherein said polymers are selected from the group consisting of polyethylene, polypropylene, ethylene-propylene copolymers, ethylene-vinyl acetate copolymers, polyvinyl chloride, polyvinyl acetate, polystyrene, poly(methylstyrene), polymethylmethacrylate, polyundecanamide, polydodecalactam, and polycaprolactam.

15. The method according to claim 8 wherein said polymers are sequential or graft copolymers of olefins and vinylic monomers, polyarylvinyl compounds and polyacrylates.

* * * * *